(12) United States Patent
Kota et al.

(10) Patent No.: US 7,069,392 B2
(45) Date of Patent: Jun. 27, 2006

(54) METHODS AND APPARATUS FOR EXTENDED PACKET COMMUNICATIONS BETWEEN MULTIPROCESSOR CLUSTERS

(75) Inventors: Rajesh Kota, Austin, TX (US); Shashank Newawarker, Austin, TX (US); Guru Prasadh, Austin, TX (US); Carl Zeitler, Tomball, TX (US); David B. Glasco, Austin, TX (US)

(73) Assignee: Newisys, Inc., Austin, TX (US)

( * ) Notice: Subject to any disclaimer, the term of this patent is extended or adjusted under 35 U.S.C. 154(b) by 393 days.

(21) Appl. No.: 10/462,015

(22) Filed: Jun. 12, 2003

(65) Prior Publication Data

US 2004/0255002 A1 Dec. 16, 2004

(51) Int. Cl.
*G06F 12/00* (2006.01)
(52) U.S. Cl. ............................ 711/141; 711/154; 714/6; 709/216; 709/218
(58) Field of Classification Search ................ 711/141, 711/146, 144, 145; 709/206, 213, 216, 217, 709/218, 219
See application file for complete search history.

(56) References Cited

U.S. PATENT DOCUMENTS

| | | | | | |
|---|---|---|---|---|---|
| 5,933,860 | A | * | 8/1999 | Emer et al. ................. | 711/213 |
| 6,151,688 | A | * | 11/2000 | Wipfel et al. ................. | 714/48 |
| 6,167,492 | A | | 12/2000 | Keller et al. ................. | 711/154 |
| 6,209,065 | B1 | * | 3/2001 | Van Doren et al. ......... | 711/150 |
| 6,292,906 | B1 | * | 9/2001 | Fu et al. ......................... | 714/6 |
| 6,385,705 | B1 | | 5/2002 | Keller et al. ................. | 711/154 |
| 6,490,661 | B1 | | 12/2002 | Keller et al. ................. | 711/150 |
| 6,631,447 | B1 | * | 10/2003 | Morioka et al. ............. | 711/141 |
| 2004/0255002 | A1 | * | 12/2004 | Kota et al. ................... | 709/213 |

OTHER PUBLICATIONS

Powell, et al., "Reducing Set-Associative Cache Energy via Way-Prediction and Selective Direct-Mapping", © 2001 IEEE, p. 54-65.*
Kim, et al., "Power-aware Partitioned Cache Architectures", © 2001 ACM, p. 64-67.*
HyperTransport™ I/O Link Specification Revision 1.03, HyperTransport™ Consortium, Oct. 10, 2001, Copyright © 2001 HyperTransport Technology Consortium.

* cited by examiner

*Primary Examiner*—Brian R. Peugh
(74) *Attorney, Agent, or Firm*—Beyer Weaver & Thomas, LLP

(57) ABSTRACT

According to the present invention, methods and apparatus are provided for increasing the efficiency and effectiveness of communications between multiprocessor clusters. Mechanisms for improving the accuracy of information available to an interconnection controller are implemented in order to allow the interconnection controller to increase reliability and reduce latency in a multiple cluster system. Protocol extensions and link layer extensions are provided with packets to convey information between interconnection controllers of separate multiprocessor clusters.

24 Claims, 12 Drawing Sheets

| | | Local Table | | Global Table | | | |
|---|---|---|---|---|---|---|---|
| | | Dest Node | | Dest Cluster | | | |
| Source | | $N_0$ | $N_1$ | $C_0$ | $C_1$ | $C_2$ | $C_3$ |
| Cluster 0 | Node 0 | X | $L_0$ | NA | NA | NA | NA |
| | Node 1 | $L_0$ | X | X | $L_1$ | $L_2$ | $L_1$ |
| Cluster 1 | Node 0 | X | $L_0$ | NA | NA | NA | NA |
| | Node 1 | $L_0$ | X | $L_1$ | X | $L_2$ | $L_2$ |
| Cluster 2 | Node 0 | X | $L_0$ | NA | NA | NA | NA |
| | Node 1 | $L_0$ | X | $L_2$ | $L_2$ | X | $L_1$ |
| Cluster 3 | Node 0 | X | $L_0$ | NA | NA | NA | NA |
| | Node 1 | $L_0$ | X | $L_2$ | $L_2$ | $L_1$ | X | ize
METHODS AND APPARATUS FOR EXTENDED PACKET COMMUNICATIONS BETWEEN MULTIPROCESSOR CLUSTERS

CROSS-REFERENCE TO RELATED APPLICATIONS

The present application is related to filed U.S. patent application Ser. No. 10/288,347 and Ser. No. 10/288,399, both titled Methods And Apparatus For Managing Probe Requests by David B. Glasco and filed on Nov. 4, 2002, the entireties of which are incorporated by reference herein for all purposes.

BACKGROUND OF THE INVENTION

1. Field of the Invention

The present invention generally relates to a multiple processor system. More specifically, the present invention provides techniques for effective and efficient communication between multiple processor clusters.

2. Description of Related Art

Performance limitations have led to the development of a point-to-point architecture for connecting processors in a system with a single memory space. In one example, individual processors can be directly connected to each other through a plurality of point-to-point links to form a cluster of processors. Separate clusters of processors can also be connected. The point-to-point links significantly increase the bandwidth for coprocessing and multiprocessing functions.

In such a multiple processor, multiple cluster system, processors send probe requests in order to perform operations on particular memory lines that may be cached in local or remote nodes. Some common operations include read block and read block modify operations on memory lines. In many examples, packets associated with transactions such as read requests are transmitted between clusters of processors. However, mechanisms for transmitting packets such as read requests between clusters are limited.

Consequently, it is desirable to provide techniques for improving the mechanisms and techniques for communications between clusters in systems having multiple clusters of multiple processors connected using point-to-point links.

SUMMARY OF THE INVENTION

According to the present invention, methods and apparatus are provided for increasing the efficiency and effectiveness of communications between multiprocessor clusters. Mechanisms for improving the accuracy of information available to an interconnection controller are implemented in order to allow the interconnection controller to increase reliability and reduce latency in a multiple cluster system. Protocol extensions and link layer extensions are provided with packets to convey information between interconnection controllers of separate multiprocessor clusters.

In one embodiment, a computer system is provided. The computer system includes a request cluster and a home cluster. The request cluster includes a first plurality of processor and a request cluster interconnection controller. The first plurality of processors and the request cluster interconnection controller in communication using a point-to-point architecture. A home cluster including a second plurality of processors and a home cluster interconnection controller, the second plurality of processors and the home cluster interconnection controller in communication using a point-to-point architecture, wherein the home cluster interconnection controller is configured to receive a probe request associated with a memory line from the request cluster interconnection controller. The probe request includes protocol extension information and link layer extension information.

In another embodiment, a method for transmitting information between multiple processor clusters. A probe request associated with a memory line is received from a request cluster interconnection controller. Protocol extension information and link layer extension information is extracted from the probe request at a home cluster interconnection controller. The home cluster including a plurality of processor connected using a point-to-point architecture.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. Multi-processor architectures having point-to-point communication among their processors are suitable for implementing specific embodiments of the present invention. In the following description, numerous specific details are set forth in order to provide a thorough understanding of the present invention. The present invention may be practiced without some or all of these specific details. Well-known process operations have not been described in detail in order not to unnecessarily obscure the present invention. Furthermore, the present application's reference to a particular singular entity includes that possibility that the methods and apparatus of the present invention can be implemented using more than one entity, unless the context clearly dictates otherwise.

Figure 1A:
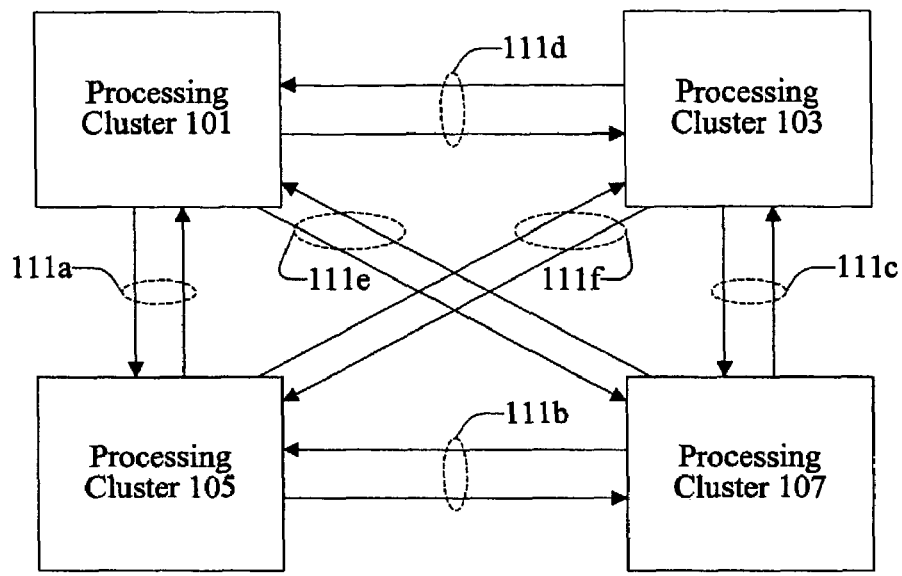
FIGS. 1A and 1B are diagrammatic representations depicting systems having multiple clusters.

FIG. 1A is a diagrammatic representation of one example of a multiple cluster, multiple processor system which may employ the techniques of the present invention. Each processing cluster 101, 103, 105, and 107 includes a plurality of processors. The processing clusters 101, 103, 105, and 107 are connected to each other through point-to-point links 111a–f. The multiple processors in the multiple cluster architecture shown in FIG. 1A share a global memory space. In this example, the point-to-point links 111a–f are internal system connections that are used in place of a traditional front-side bus to connect the multiple processors in the multiple clusters 101, 103, 105, and 107. The point-to-point links may support any point-to-point coherence protocol.

Figure 1B:
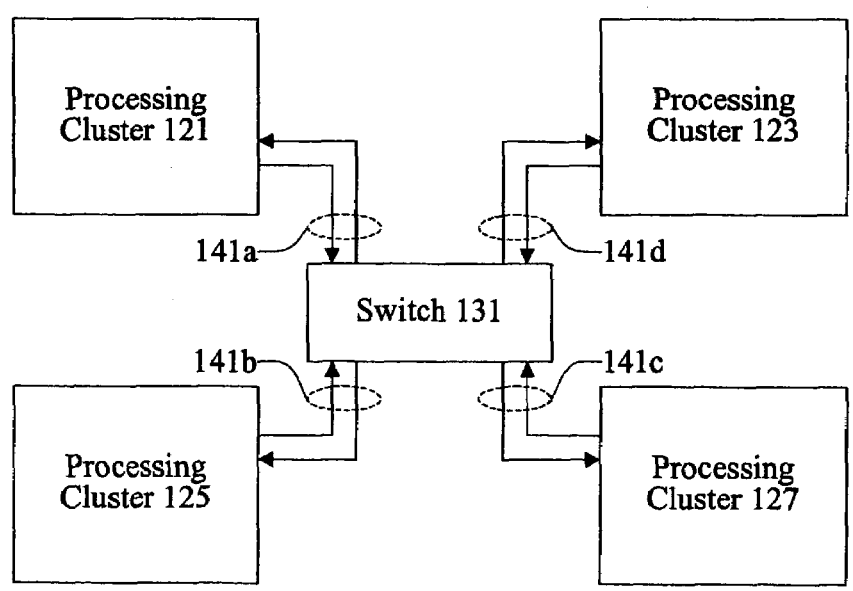

FIG. 1B is a diagrammatic representation of another example of a multiple cluster, multiple processor system that may employ the techniques of the present invention. Each processing cluster 121, 123, 125, and 127 is coupled to a switch 131 through point-to-point links 141a–d. It should be noted that using a switch and point-to-point links allows implementation with fewer point-to-point links when connecting multiple clusters in the system. A switch 131 can include a general purpose processor with a coherence protocol interface. According to various implementations, a multi-cluster system shown in FIG. 1A may be expanded using a switch 131 as shown in FIG. 1B.

Figure 2:
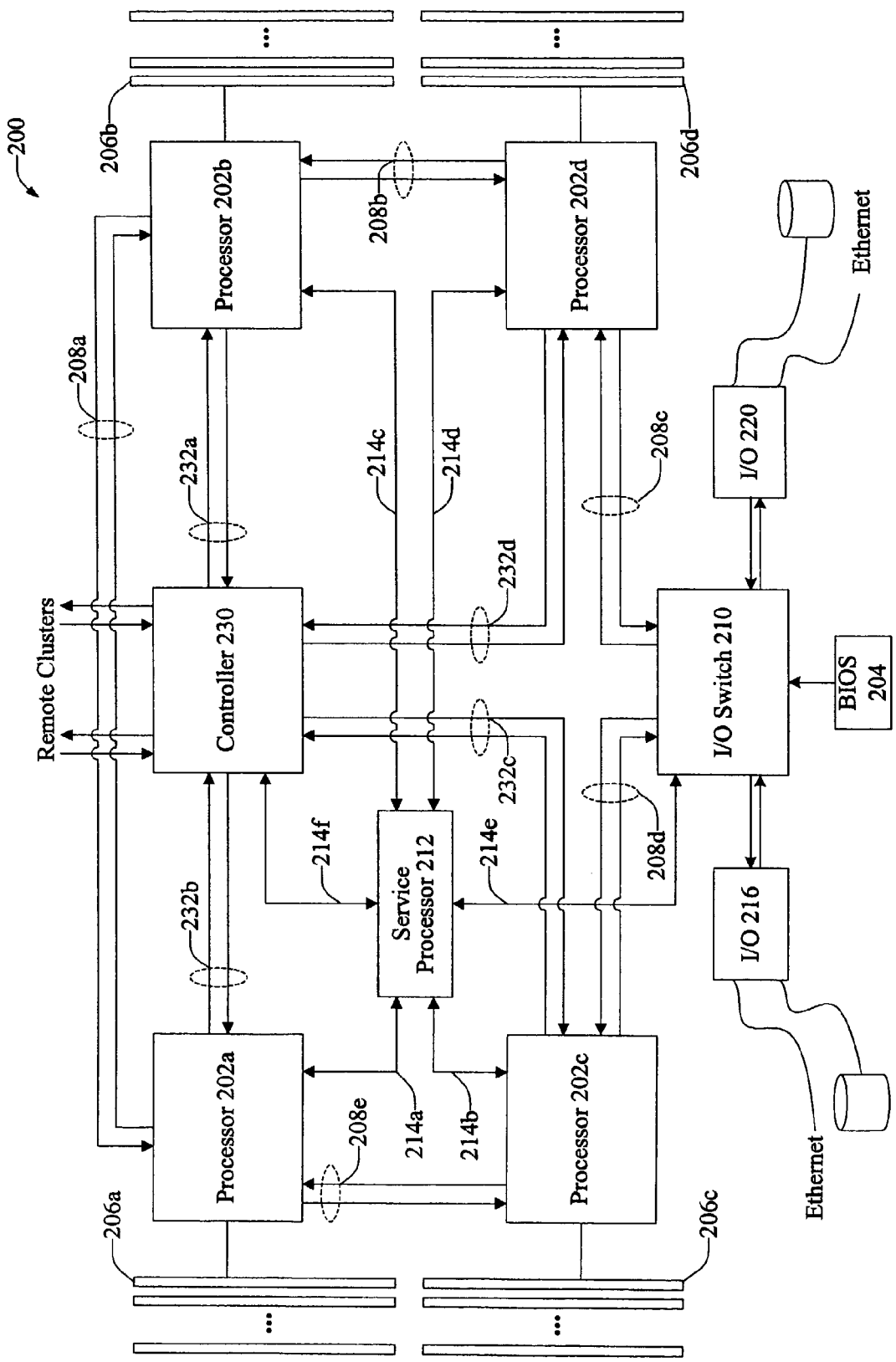
FIG. 2 is a diagrammatic representation of an exemplary cluster having a plurality of processors.

FIG. 2 is a diagrammatic representation of one example of a multiple processor cluster. Cluster 200 includes processors 202a–202d, one or more Basic I/O systems (BIOS) 204, a memory subsystem comprising memory banks 206a–206d, point-to-point communication links 208a–208e, and a service processor 212. The point-to-point communication links are configured to allow interconnections between processors 202a–202d, I/O switch 210, and interconnection controller 230. The service processor 212 is configured to allow communications with processors 202a–202d, I/O switch 210, and interconnection controller 230 via a JTAG interface represented in FIG. 2 by links 214a–214f. It should be noted that other interfaces are supported. I/O switch 210 connects the rest of the system to I/O adapters 216 and 220, and to BIOS 204 for booting purposes.

According to specific embodiments, the service processor of the present invention has the intelligence to partition system resources according to a previously specified partitioning schema. The partitioning can be achieved through direct manipulation of routing tables associated with the system processors by the service processor which is made possible by the point-to-point communication infrastructure. The routing tables can also be changed by execution of the BIOS code in one or more processors. The routing tables are used to control and isolate various system resources, the connections between which are defined therein.

The processors 202a–d are also coupled to an interconnection controller 230 through point-to-point links 232a–d. According to various embodiments and as will be described below in greater detail, the interconnection controller 230 performs a variety of functions which enable the number of interconnected processors in the system to exceed the node ID space and mapping table limitations associated with each of a plurality of processor clusters. According to some embodiments, the interconnection controller 230 performs a variety of other functions including the maintaining of cache coherency across clusters. Interconnection controller 230 can be coupled to similar controllers associated with other multi-processor clusters. It should be noted that there can be more than one such interconnection controller in one cluster. Interconnection controller 230 communicates with both processors 202a–d as well as remote clusters using a point-to-point protocol.

More generally, it should be understood that the specific architecture shown in FIG. 2 is merely exemplary and that embodiments of the present invention are contemplated having different configurations and resource interconnections, and a variety of alternatives for each of the system resources shown. However, for purpose of illustration, specific details of cluster 200 will be assumed. For example, most of the resources shown in FIG. 2 are assumed to reside on a single electronic assembly. In addition, memory banks 206a–206d may comprise double data rate (DDR) memory which is physically provided as dual in-line memory modules (DIMMs). I/O adapter 216 may be, for example, an ultra direct memory access (UDMA) controller or a small computer system interface (SCSI) controller which provides access to a permanent storage device. I/O adapter 220 may be an Ethernet card adapted to provide communications with a network such as, for example, a local area network (LAN) or the Internet. BIOS 204 may be any persistent memory like flash memory.

According to one embodiment, service processor 212 is a Motorola MPC855T microprocessor which includes integrated chipset functions, and interconnection controller 230 is an Application Specific Integrated Circuit (ASIC) supporting the local point-to-point coherence protocol. Interconnection controller 230 can also be configured to handle a non-coherent protocol to allow communication with I/O devices. In one embodiment, the interconnection controller 230 is a specially configured programmable chip such as a programmable logic device or a field programmable gate array. In another embodiment, the interconnect controller 230 is an Application Specific Integrated Circuit (ASIC). In yet another embodiment, the interconnect controller 230 is a general purpose processor augmented with an ability to access and process interconnect packet traffic.

Figure 3:
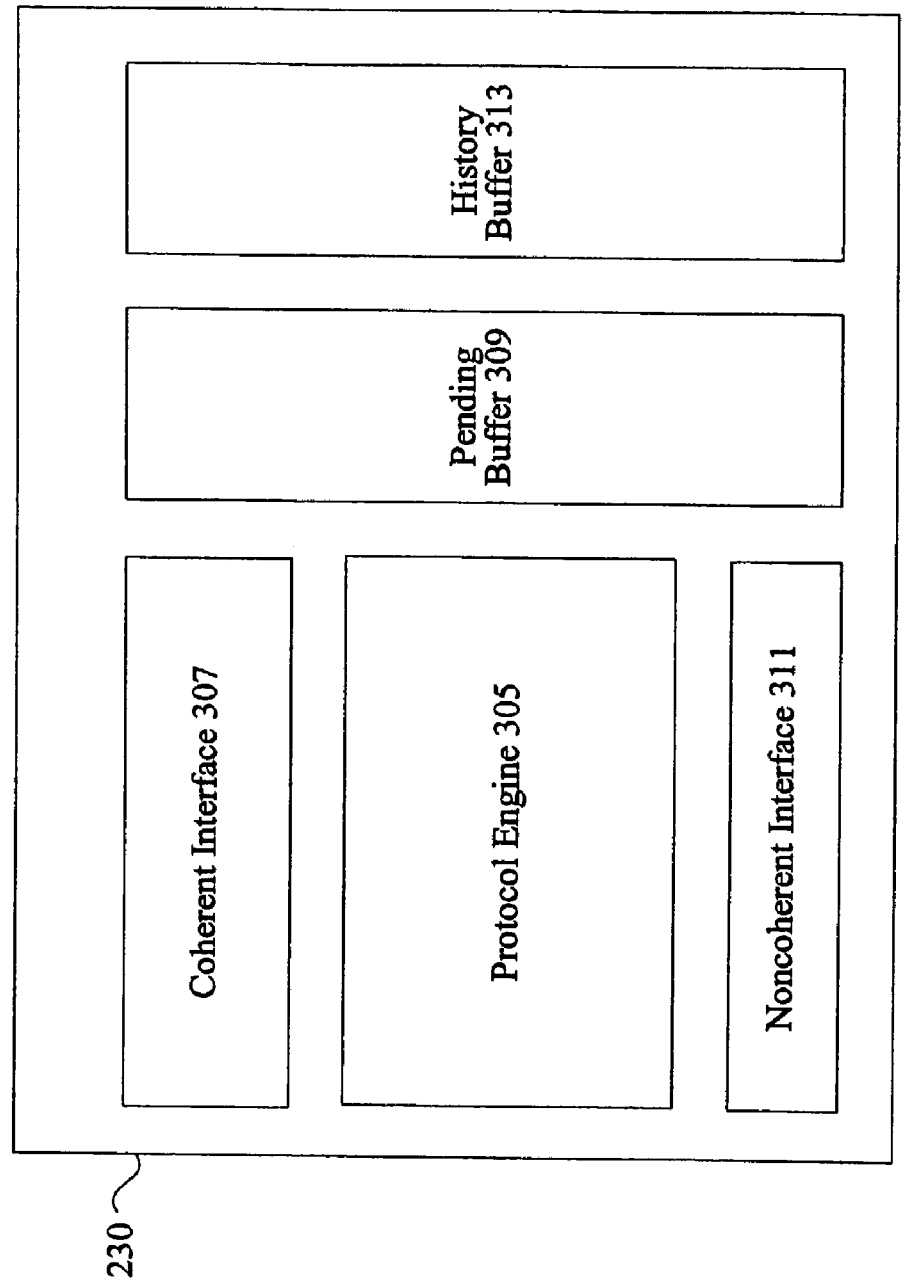
FIG. 3 is a diagrammatic representation of an exemplary interconnection controller for facilitating various embodiments of the present invention.

FIG. 3 is a diagrammatic representation of one example of an interconnection controller 230 for facilitating various aspects of the present invention. According to various embodiments, the interconnection controller includes a protocol engine 305 configured to handle packets such as probes and requests received from processors in various clusters of a multi-processor system. The functionality of the protocol engine 305 can be partitioned across several engines to improve performance. In one example, partitioning is done based on packet type (request, probe and response), direction (incoming and outgoing), or transaction flow (request flows, probe flows, etc).

The protocol engine 305 has access to a pending buffer 309 that allows the interconnection controller to track transactions such as recent requests and probes and associate the transactions with specific processors. Transaction information maintained in the pending buffer 309 can include transaction destination nodes, the addresses of requests for subsequent collision detection and protocol optimizations, response information, tags, and state information. A history buffer 311 may also be provided to allow for efficient retransmission of packets that have not been successfully received by an interconnection controller in another cluster.

The interconnection controller has a coherent protocol interface 307 that allows the interconnection controller to communicate with other processors in the cluster as well as external processor clusters. The interconnection controller may also include other interfaces such as a non-coherent protocol interface 311 for communicating with I/O devices (e.g., as represented in FIG. 2 by links 208c and 208d). According to various embodiments, each interface 307 and 311 is implemented either as a full crossbar or as separate receive and transmit units using components such as multiplexers and buffers. It should be noted that the interconnection controller 230 does not necessarily need to provide both coherent and non-coherent interfaces. It should also be noted that an interconnection controller 230 in one cluster can communicate with an interconnection controller 230 in another cluster.

Figure 4:
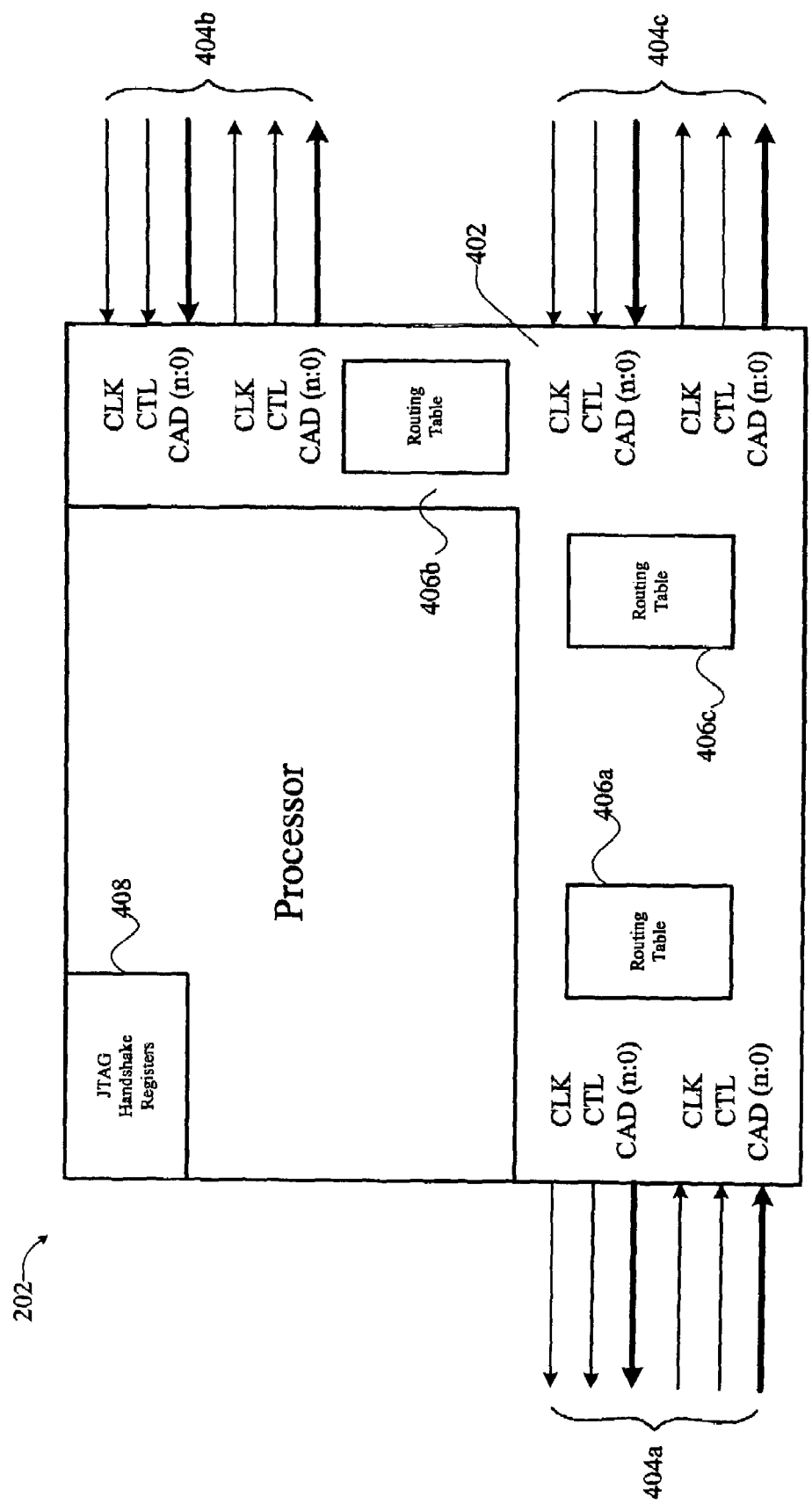
FIG. 4 is a diagrammatic representation of a local processor.

According to various embodiments of the invention, processors 202a–202d are substantially identical. FIG. 4 is a simplified block diagram of such a processor 202 which includes an interface 402 having a plurality of ports 404a–404c and routing tables 406a–406c associated therewith. Each port 404 allows communication with other resources, e.g., processors or I/O devices, in the computer system via associated links, e.g., links 208a–208e of FIG. 2.

The infrastructure shown in FIG. 4 can be generalized as a point-to-point, distributed routing mechanism which comprises a plurality of segments interconnecting the systems processors according to any of a variety of topologies, e.g., ring, mesh, etc. Each of the endpoints of each of the segments is associated with a connected processor which has a unique node ID and a plurality of associated resources which it "owns," e.g., the memory and I/O to which it's connected.

The routing tables associated with each of the nodes in the distributed routing mechanism collectively represent the current state of interconnection among the computer system resources. Each of the resources (e.g., a specific memory range or I/O device) owned by any given node (e.g., processor) is represented in the routing table(s) associated with the node as an address. When a request arrives at a node, the requested address is compared to a two level entry in the node's routing table identifying the appropriate node and link, i.e., given a particular address within a range of addresses, go to node x; and for node x use link y.

As shown in FIG. 4, processor 202 can conduct point-to-point communication with three other processors according to the information in the associated routing tables. According to a specific embodiment, routing tables 406a–406c comprise two-level tables, a first level associating the unique addresses of system resources (e.g., a memory bank) with a corresponding node (e.g., one of the processors), and a second level associating each node with the link (e.g., 208a–208e) to be used to reach the node from the current node.

Processor 202 also has a set of JTAG handshake registers 408 which, among other things, facilitate communication between the service processor (e.g., service processor 212 of FIG. 2) and processor 202. That is, the service processor can write routing table entries to handshake registers 408 for eventual storage in routing tables 406a–406c. It should be understood that the processor architecture depicted in FIG. 4 is merely exemplary for the purpose of describing a specific embodiment of the present invention. For example, a fewer or greater number of ports and/or routing tables may be used to implement other embodiments of the invention.

As mentioned above, the basic protocol upon which the clusters in specific embodiments of the invention are based provides for a limited node ID space which, according to a particular implementation, is a 3-bit space, therefore allowing for the unique identification of only 8 nodes. That is, if this basic protocol is employed without the innovations represented by the present invention, only 8 nodes may be interconnected in a single cluster via the point-to-point infrastructure. To get around this limitation, the present invention introduces a hierarchical mechanism which preserves the single-layer identification scheme within particular clusters while enabling interconnection with and communication between other similarly situated clusters and processing nodes.

According to a specific embodiment, one of the nodes in each multi-processor cluster is an interconnection controller, e.g., the interconnection controller 230 of FIG. 2, which manages the hierarchical mapping of information thereby enabling multiple clusters to share a single memory address space while simultaneously allowing the processors within its cluster to operate and to interact with any processor in any cluster without "knowledge" of anything outside of their own cluster. The interconnection controller appears to its associated processor to be just another one of the processors or nodes in the cluster.

In the basic protocol, when a particular processor in a cluster generates a request, a set of address mapping tables are employed to map the request to one of the other nodes in the cluster. That is, each node in a cluster has a portion of a shared memory space with which it is associated. There are different types of address mapping tables for main memory, memory-mapped I/O, different types of I/O space, etc. These address mapping tables map the address identified in the request to a particular node in the cluster.

A set of routing tables are then employed to determine how to get from the requesting node to the node identified from the address mapping table. That is, as discussed above, each processor (i.e., cluster node) has associated routing tables which identify a particular link in the point-to-point infrastructure which may be used to transmit the request from the current node to the node identified from the address mapping tables. Although generally a node may correspond to one or a plurality of resources (including, for example, a processor), it should be noted that the terms node and processor are often used interchangeably herein. According to a particular implementation, a node comprises multiple sub-units, e.g., CPUs, memory controllers, I/O bridges, etc., each of which has a unit ID.

In addition, because individual transactions may be segmented in non-consecutive packets, each packet includes a unique transaction tag to identify the transaction with which the packet is associated with reference to the node which initiated the transaction. According to a specific implementation, a transaction tag identifies the source node (3-bit field), the source node unit (2-bit field), and a transaction ID (5-bit field).

Thus, when a transaction is initiated at a particular node, the address mapping tables are employed to identify the destination node (and unit) which are then appended to the packet and used by the routing tables to identify the appropriate link(s) on which to route the packet. The source information is used by the destination node and any other nodes which are probed with the request to respond to the request appropriately.

According to a specific embodiment and as mentioned above, the interconnection controller in each cluster appears to the other processors in its cluster as just another processor in the cluster. However, the portion of the shared memory space associated with the interconnection controller actually encompasses the remainder of the globally shared memory space, i.e., the memory associated with all other clusters in the system. That is, from the perspective of the local processors in a particular cluster, the memory space associated with all of the other multi-processor clusters in the system are represented by the interconnection controller(s) in their own cluster.

According to an even more specific embodiment which will be described with reference to FIG. 5, each cluster has five nodes (e.g., as shown in FIG. 2) which include four processors 202a–d and an interconnection controller 230, each of which is represented by a 3-bit node ID which is unique within the cluster. As mentioned above, each processor (i.e., cluster node) may represent a number of sub-units including, for example, CPUs, memory controllers, etc.

Figure 5:
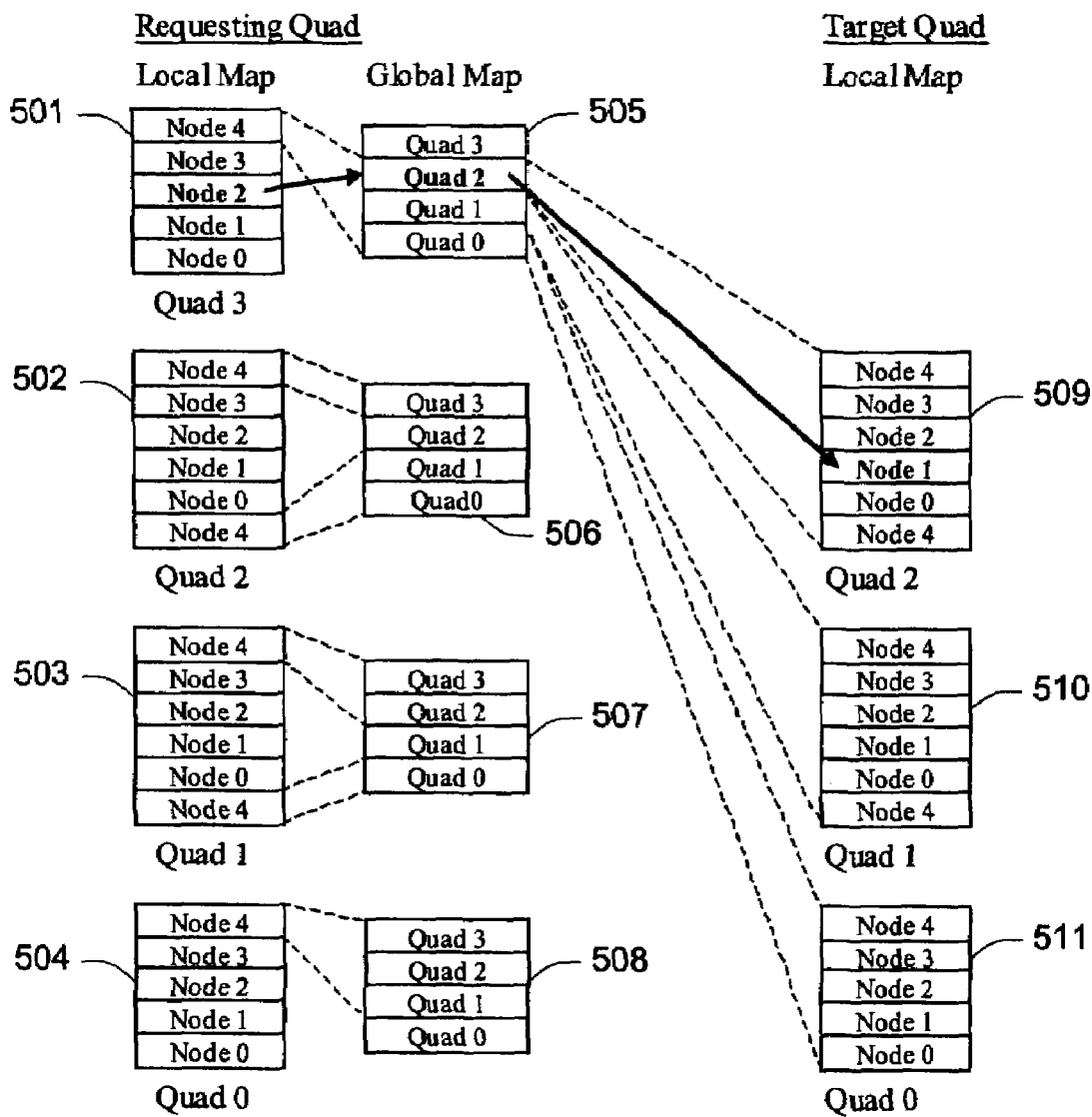
FIG. 5 is a diagrammatic representation of a memory mapping scheme according to a particular embodiment of the invention.

An illustration of an exemplary address mapping scheme designed according to the invention and assuming such a cluster configuration is shown in FIG. 5. In the illustrated example, it is also assumed that the global memory space is shared by 4 such clusters also referred to herein as quads (in that each contains four local processors). As will be understood, the number of clusters and nodes within each cluster may vary according to different embodiments.

To extend the address mapping function beyond a single cluster, each cluster maps its local memory space, i.e., the portion of the global memory space associated with the processors in that cluster, into a contiguous region while the remaining portion of the global memory space above and below this region is mapped to the local interconnection controller(s). The interconnection controller in each cluster maintains two mapping tables: a global map and local map. The global map maps outgoing requests to remote clusters. The local map maps incoming requests from remote clusters to a particular node within the local cluster.

Referring now to FIG. 5, each local cluster has a local memory map (501–504), which maps the local memory space (i.e., the contiguous portion of the global memory space associated with the local processors) into the respective nodes and maps all remote memory spaces (i.e., the remainder of the global memory space) into one or two map entries associated with the local interconnection controller(s), e.g., Node 4 of Quad 3. Each node in the local cluster has a copy of the local map. The interconnection controller in each cluster also maintains a global map (505–508) relating these remote memory spaces with each of the other clusters in the system. Each interconnection controller uses its copy of the local map (509–511) to map requests received from remote clusters to the individual nodes in its cluster.

An exemplary transaction described with reference to FIG. 5 may be illustrative. In this example, Node 2 in Quad 3 generates a request that maps (via map 501) to the local interconnection controller (i.e., Node 4). When the interconnection controller receives this request, its global map 505 maps the address to Quad 2. The interconnection controller then forwards the request to Quad 2. The interconnection controller at Quad 2 uses its local memory map to determine the proper node to target for the request—Node 1 in this example.

In a particular implementation, each processor or cluster node is limited to eight memory map registers. The scheme described above with reference to FIG. 5 requires four entries for the local memory space and at most two registers for remote space. Therefore, according to more specific embodiments, the two remaining entries can be used to subdivide regions. The eight mapping register limit requires that all memory local to a quad be allocated within a contiguous block. The interconnection controller's local memory map in such embodiments is also eight entries. However, the size of the interconnection controller's global map size is determined by the number of clusters in the system. According to various embodiments, the memory mapped I/O space is mapped by an identical set of mapping registers.

As described above, on the local cluster level, information from address mapping tables is used to identify the appropriate link on which to transmit information to a destination node within the cluster. To effect transmissions between clusters using the global mapping described above, a similar mechanism is needed. Therefore, according to various embodiments, in addition to the local routing tables associated with each node in a cluster, the interconnection controller maintains global routing information which maps the other clusters in the system to the various point-to-point transmission links interconnecting the clusters (e.g., links 111 of FIG. 1A).

According to a specific embodiment of the invention, two types of local routing tables are employed: one for directed packets and one for broadcast packets. Each table (e.g., tables 406 of FIG. 4) maintains a mapping between target nodes and links. For directed packets, a separate table is used for request and for responses. This allows responses to be routed back to the requester along the same path as the request. Maintaining the same route simplifies debugging and is not required for correctness. For broadcast packets, the corresponding table indicates on which links the broadcast packet is forwarded. A broadcast packet may thus be routed to multiple links.

In a particular implementation of the interconnection controller of the present invention, its local tables map a local destination node to one of four links for directed packets and any number of links for broadcast packets. The interconnection controller also maintains a global routing table which maps remote destination clusters to a particular remote link. According to a particular embodiment, the interconnection controller also supports multicast of packets at the global routing level.

Figures 6A, 6B:
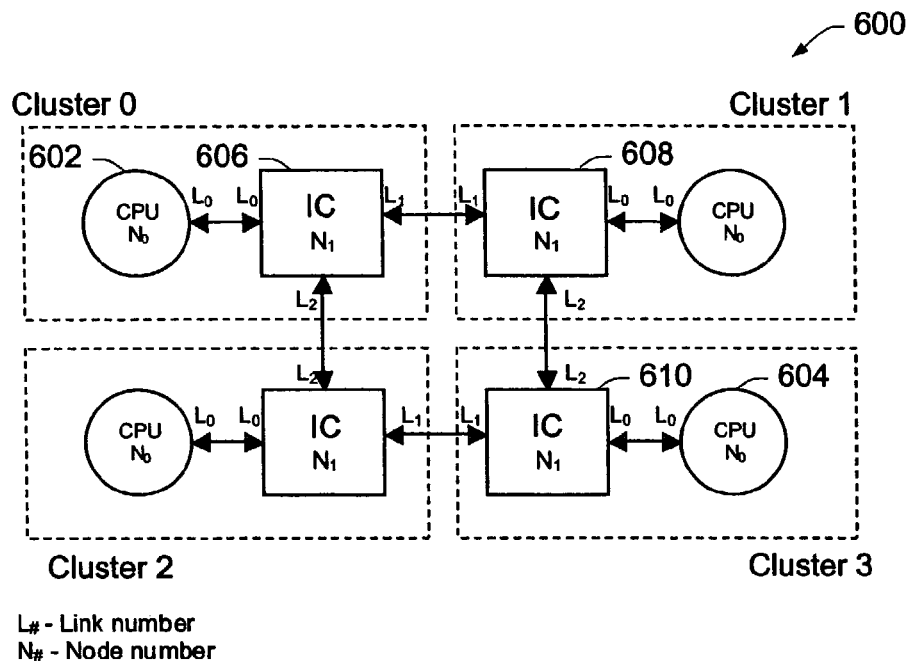
FIG. 6A is a simplified block diagram of a four cluster system for illustrating a specific embodiment of the invention.
FIG. 6B is a combined routing table including routing information for the four cluster system of FIG. 6A.

A specific embodiment of a routing mechanism designed according to the present invention will now be described with reference to FIGS. 6A and 6B. System 600 of FIG. 6A includes four clusters each having a plurality of local nodes including nodes $N_0$ and $N_1$. The table of FIG. 6B combines all of the local and global routing tables of the system for illustrative purposes.

As part of an exemplary transaction, a CPU 602 at node $N_0$ in Cluster 0 generates a packet directed to a CPU 604 at node $N_0$ in the Cluster 3. This packet could be, for example, a memory request that maps to a memory controller at that node. Because CPU 602 has no knowledge of anything outside of its cluster, it generates the packet targeting node $N_1$ in Cluster 0 (i.e., the local interconnection controller 606) as the destination. As discussed above, this is due to the fact that the local memory map owned by node $N_0$ (see the relevant portion of the table of FIG. 6B) identifies node $N_1$ as corresponding to all memory owned by remote clusters. Interconnection controller 606 receives the packet, uses its global address map (e.g., as described above) to determine that the final destination of the packet is Cluster 3, and generates a remote packet targeting Cluster 3. Then, using its global routing table (i.e., relevant portion of FIG. 6B), the interconnection controller 606 determines that this packet must be sent out on link $L_1$. Similar to the local routing mechanism described above, information identifying the source and destination cluster is appended to the packet.

When interconnection controller 608 at Cluster 1 receives the packet, it also determines that the packet is destined for Cluster 3 and determines from its global routing table (FIG. 6B) that link $L_2$ must be used to send the packet. Interconnection controller 610 at Cluster 3 receives the packet, determines that the packet is targeting the local cluster, and uses its local routing table (FIG. 6B) to determine that local link $L_0$ must be used to send the packet to its destination. CPU 604 at node $N_0$ then receives the packet via link $L_0$. According to specific embodiments in which the node ID space is a 3-bit ID space, this multi-level routing mechanism can be extended to eight local nodes with no specific limit on the number of clusters.

Embodiments of the invention also address the issue of transaction identification in a system having a plurality of multi-processor clusters. In general, the importance of the unique identification of transactions in a multi-processor environment is understood. And where the transaction identification or tag space is limited, mechanisms to extend it are needed to enable the interconnection of more than the maximum number of processors supported by the limited tag space. That is, in an environment with a plurality of clusters operating with identical local transaction tag spaces, there is a potential for more than one transaction to be generated in different clusters simultaneously with the identical tag. Where those transactions occur between nodes in different clusters, the potential for conflict is obvious. Therefore, embodiments of the present invention provide mechanisms which extend the local tag spaces such that each transaction in the multi-cluster system is uniquely identified.

More specifically, these embodiments map transactions from the local transaction tag space to a larger global transaction tag space. As described above, the local tag space is specified using the node ID, the unit ID, and a transaction ID. On top of that, the global tag space is specified using a global cluster ID and a global transaction ID. According to one embodiment, the interconnection controllers in the system use their pending buffers to simplify the allocation and management of the mapping and remapping actions. According to an even more specific embodiment and as will be described, additional protocol management is used to maintain the uniqueness of the global transaction tags.

According to a specific embodiment, all transactions within a cluster are tagged with a unique ID generated by the requesting node. The processors in each cluster which are not the interconnection controller support a 3-bit node ID, a 2-bit unit ID and a 5-bit transaction ID. The combination of these fields creates a 10 bit tag which is unique within the cluster. The unit ID represents sub-units within a node. It should be noted that a particular node may or may not include a processor as one of its sub-units, e.g., the node might contain only memory.

According to one embodiment, to extend the transaction tag space beyond the local cluster, each cluster's interconnection controller maps each its cluster's local tag space into the global tag space using a Q-bit Cluster ID and a T-bit Transaction ID. In the exemplary system in which each cluster has a 5-bit transaction ID and there are four clusters, T might be 7 and Q might be 2.

Figure 7:
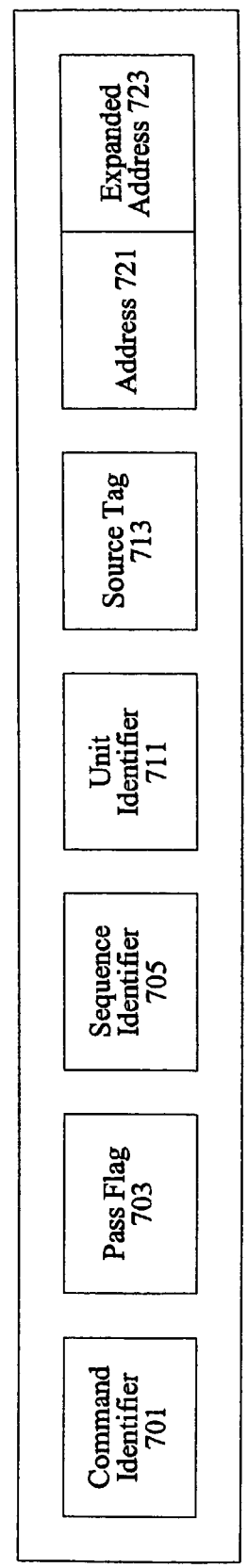
FIG. 7 is a diagrammatic representation showing a packet for communications between multiprocessor clusters.

FIG. 7 is a diagrammatic representation showing fields that may be present in a packet used for communication in a system with multiple processors interconnected through point-to-point links. A variety of packets and packet fields are used. Some examples of packets include information packets, request packets, response packets, the various data packets. According to various embodiments, a packet 700 includes parameters such as a command field 701 that identifies the type of the packet. Types of packets include request, response, information, etc. A pass indicator 703 allows the packets in a given stream to arrive out of order. Systems that do not require ordering allow for higher performance. A sequence ID 705 is used to strongly order packets in a particular stream when ordering is required. A unit ID 711 is used to identify either the source or destination node of a transaction. A source tag 713 is used to uniquely identify transactions initiated by the requester. In some examples, the source tag is used to match responses with the corresponding requests. The combination of the unit ID and the source tag can effectively serve to uniquely identify requests. The address field 721 is used to represent the address associated with transaction. In some examples, the address is the address of the memory line associated with a request. In many implementations, and address extension field 723 is also provided to allow for larger address spaces.

Figure 8:
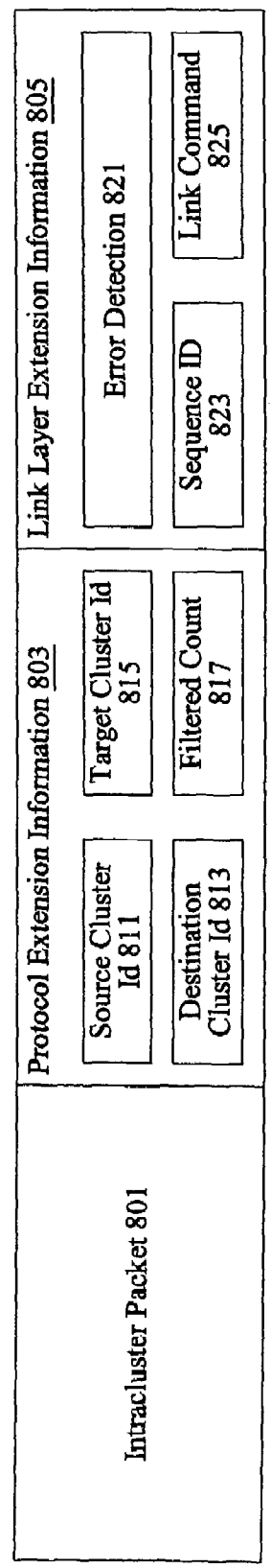
FIG. 8 is a diagrammatic representation showing an extended packet for communications between multiprocessor clusters.

FIG. 8 is a diagrammatic representation showing extension fields that can be added to a conventional packet 801 used in intracluster communications. According to various embodiments, protocol extensions 803 are provided to allow intracluster packets to be transmitted between clusters of processors. The protocol extensions includes a source cluster identifier 811. The source cluster identifier represents the cluster that includes the requesting node. The protocol extensions also include a destination cluster identifier 813. The destination cluster identifier represents the destination cluster of the packet. A target cluster identifier 815 is also provided. The target cluster identifier represents the cluster owning the address space including the memory line associated with the transaction. Information identifying a source cluster, a destination cluster, and a target cluster for inter-cluster communications is referred to herein as protocol extensions or protocol extension information. According to various embodiments, protocol extensions also include a filtered count 817.

A filtered count 817 indicates to a requesting cluster the number of responses to expect for a given request. In a system with eight clusters of processors, the source cluster, the destination cluster, the target cluster, and the filtered count can each be three bit identifiers. It should be noted that protocol extension information can include other fields as well in addition to fields 811, 813, 815, and 817. The protocol extension information provides mechanisms for transmitting extra information between coherence controllers. The extra information enables the cache coherence controller to implement cache coherence protocol optimizations above and beyond that which is available in a typical controller. The protocol extension information can also be used to adjust protocol engine functionality without having to change the design of the protocol engine.

The packet can also include link layer extensions 805. According to various embodiments, link layer extensions include error checking information 821. In one example, the error checking information is an eight bit CRC. Other examples, error correction information can be provided to allow it interconnection controller to dynamically recover corrupted data. A sequence ID 823 is provided to allow all it interconnection controller to track lost packets. A link command field 825 is also provided to indicate whether the packet is a link layer packet, control packet, or a data packet. The link command field can also provide the size of the packet such as the size of a data packet. Any information and providing error detection capabilities for communications between clusters of processors is referred to herein as link layer extensions or link layer extension information.

Figure 9:
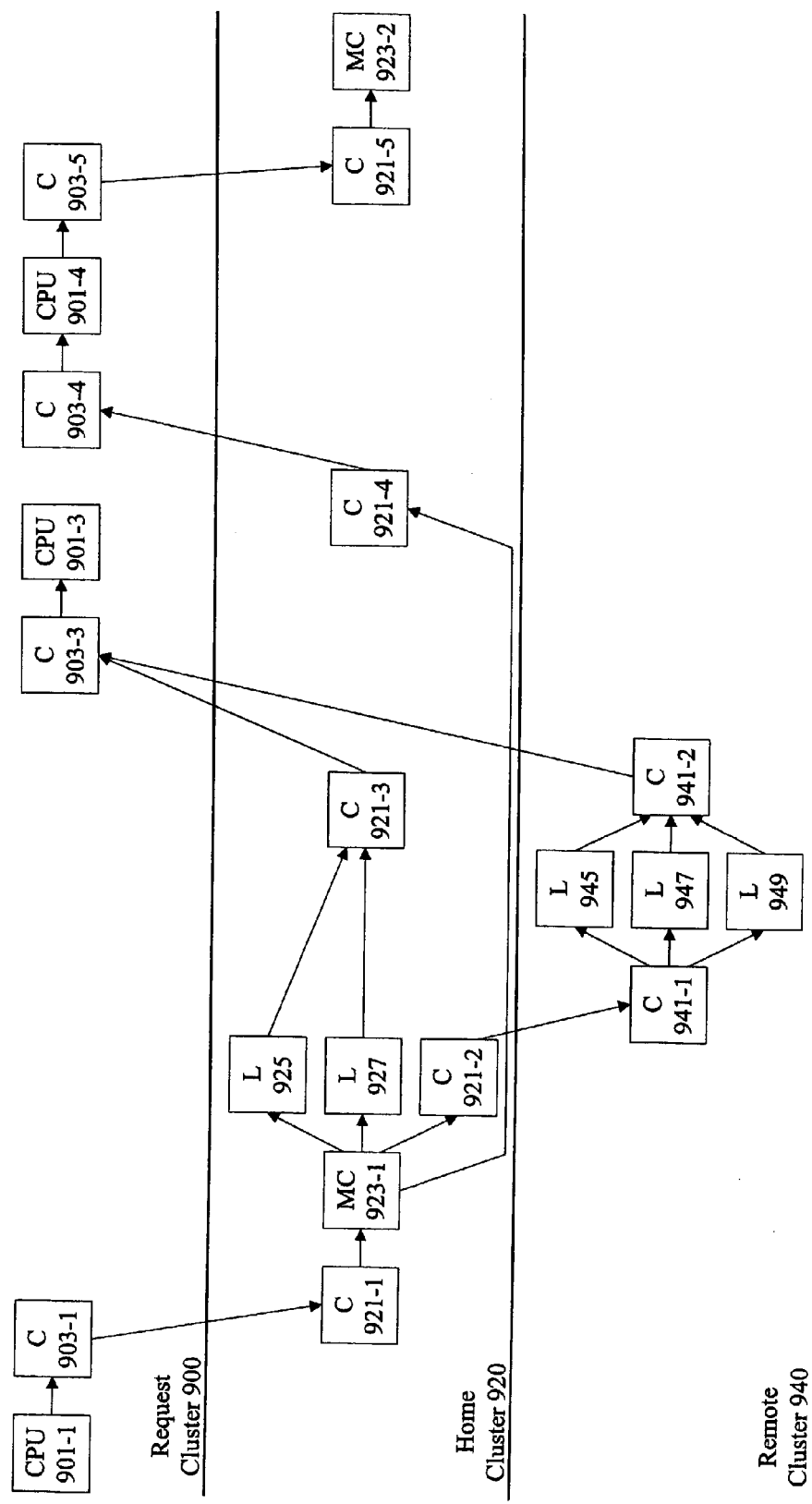
FIG. 9 is a transaction diagram showing the transmission of a probe request in a multiple cluster system.

FIG. 9 is a diagrammatic representation depicting communications for a data request from a local processor sent to a non-local cluster using an interconnection controller. In one example, the multicluster system includes a request cluster 900, a home cluster 920, and a remote cluster 940. As noted above, the home cluster 920 and the remote cluster 940 as well as any other clusters excluding the request cluster 900 are referred to herein as non-local clusters. Processors and interconnection controllers associated with local and non-local clusters are similarly referred to herein as local processors, local interconnection controllers, non-local processors, and non-local interconnection controllers, respectively.

According to various embodiments, processor 901-1 in a local cluster 900 sends a data access request such as a read request to an interconnection controller 903-1. The interconnection controller 903-1 tracks the transaction in the pending buffer. According to various embodiments, before forwarding the request to a home cluster 920, the interconnection controller 903-1 adds protocol extension information along with link layer extension information to the packet. The protocol extension information allows the request to be routed between clusters of processors. In one example, the source cluster identified in the protocol extension information is the request cluster 900. The destination cluster as well as the target cluster identified is the home cluster 920. The filtered count is not yet provided. The link layer extension information provides error correction and sequence data to the home cluster. In one example, the link layer extension allows a request cluster 900 to retransmit a packet if a home cluster 920 has not acknowledged the receipt of the packet. A request cluster interconnection controller 903-1 can keep a copy of the transmitted packet in a history buffer and remove the copy only after an acknowledgement is received. If an acknowledgment is not received, a event such as a timeout is used to trigger the retransmission of the packet.

In conventional architectures, retransmission and error detection capabilities are very limited in interprocessor communications. Error correction capabilities are minimal because a multiprocessor system is typically closed and well controlled. It is assumed that errors in transmissions between processors are unlikely and infrequent. Furthermore, adding error correction capabilities in interprocessor communications adds greatly to the overhead of a system where millions of memory access requests occur in a fraction of a second. This contrasts with a network system with routers and switches where packet dropping due to congestion and link availability changes are relatively frequent.

However, the techniques of the present invention recognize that expanding the number of processors by providing multiple clusters in a system greatly increases the likelihood of interprocessor transmission errors. Consequently, error correction mechanisms are provided for communications between clusters. However, the relative closed intracluster communications remain largely without error correction extensions. According to various embodiments, the error correction mechanisms are only provided for intercluster communications. However, it is contemplated that error correction mechanisms are also beneficial for certain intracluster communications.

To allow intercluster communications along with error detection capabilities, protocol extensions along with link layer extensions are added to the packet by the interconnection controller 903-1. The packet is copied into the history buffer and transmitted to the home cluster 920. In some examples, the interconnection controller 903-1 waits for an indicia that the packet was received. In one example, the indicia is an acknowledgement. The packet can then be removed from the history buffer.

The interconnection controller 921-1 at the home cluster 920 receives the access request and tracks the request in its pending buffer. In one example, information associated with the requests are stored in the pending buffer and the UnitID and SrcTag described in FIG. 7 is used to track the transaction. The interconnection controller 921-1 removes the protocol extensions and the link layer extensions and forwards the access request to a memory controller 923-1 also associated with the home cluster 920. At this point, the memory controller 923-1 locks the memory line associated with the request. In one example, the memory line is a unique address in the memory space shared by the multiple processors in the request cluster 900, home cluster 920, and the remote cluster 940. The memory controller 923-1 generates a probe associated with the data access request and forwards the probe to local nodes associated with cache blocks 925 and 927 as well as to interconnection controller 921-2. According to various embodiments, the interconnection controller 921-2 updates the protocol and link layer extensions associated with the probe before forwarding the probe. In one example, the interconnection controller 921-2 accesses a coherence directory to determine what clusters need to be probed based upon the type of request and the state of the memory line in other clusters.

The coherence directory tracks the various transactions such as probe requests and responses in a multiple cluster system to determine when memory lines are added to the coherence directory, when memory lines are removed from the directory, and when information associated with each memory line is updated. By using the coherence directory, the techniques of the present invention recognize that the number of transactions such as probe requests can be reduced by managing or filtering probes that do not need to be sent to specific clusters.

For example, if the state of the memory line associated with a probe is invalid as indicated in the coherence directory, no copies of the memory line reside in other clusters. Consequently, only the home cluster needs to be probed and a filtered count of one can be used to indicate to a request cluster that the request cluster should expect only a single response from home cluster instead of a response from each of the clusters. Any mechanism for relaying to the request cluster the number of responses to a probe to expect from other clusters is referred to herein as a filtered count.

Techniques and mechanisms for reducing the number of probes and probe requests in a system by using a coherence directory along with probe filter information and memory controller filter information are described in U.S. patent application Ser. No. 10/288,347 and Ser. No. 10/288,399, both titled Methods And Apparatus For Managing Probe Requests by David B. Glasco and filed on Nov. 4, 2002, the entireties of which are incorporated by reference herein for all purposes.

In one example, the interconnection controller 921-2 accesses a coherence directory to determine that only a remote cluster 940 needs to be probed. The interconnection controller 921-2 provides protocol extension information and link layer extension information so that the source is set to identify the request cluster 900, the destination is set to identify the remote cluster 940, and the target is set to identify the home cluster 920. In one example, the interconnection controller 921-2 uses information in the pending buffer to determine what the various fields should be set to. A packet with a filtered count of one can be provided to indicate that only a single response should be expected by the request cluster 900. The probe along with protocol and link layer extensions is transmitted to the remote cluster 940 using error detection and retransmission mechanisms provided by the link layer extensions.

The interconnection controller 941-1 associated with the remote cluster 940 receives the probe from interconnection controller 921-2 and removes the protocol and link layer extensions while maintaining information about the probe in the pending buffer. Local nodes associated with cache blocks 945, 947, and 949 are then probed.

According to various embodiments, the interconnection controller 903-3 accumulates probe responses based on the filtered count and forwards the probe responses to the processor 901-3. While probes and probe responses carry information for maintaining cache coherency in the system, read responses can carry actual fetched data. After receiving the fetched data, processor 901-4 may send a source done response to interconnection controller 903-5. According to various embodiments, the transaction is now complete at the requesting cluster 900. Interconnection controller 903-5 forwards the source done message to interconnection controller 921-5. Interconnection controller 921-5 in turn sends a source done message to memory controller 923-2. Upon receiving the source done message, the memory controller 923-2 can unlock the memory line and the transaction at the home cluster 920 is now complete. Another processor can now access the unlocked memory line.

As will be appreciated by one of skill in the art, the specific transaction sequences involving requests, probes, and response messages can vary depending on the specific implementation. In one example, an interconnection controller 921-3 may wait to receive a read response message from a memory controller 923-1 before transmitting both a probe response message and a read response message to an interconnection controller 903-3. In other examples, an interconnection controller may be the actual processor generating the request. Some processors may operate as both a processor and as an interconnection controller. Furthermore, various data access request messages, probes, and responses associated with reads and writes are contemplated. As noted above, any message for snooping a cache can be referred to as a probe. Similarly, any message for indicating to the memory controller that a memory line should be unlocked can be referred to as a source done message.

Figure 10:
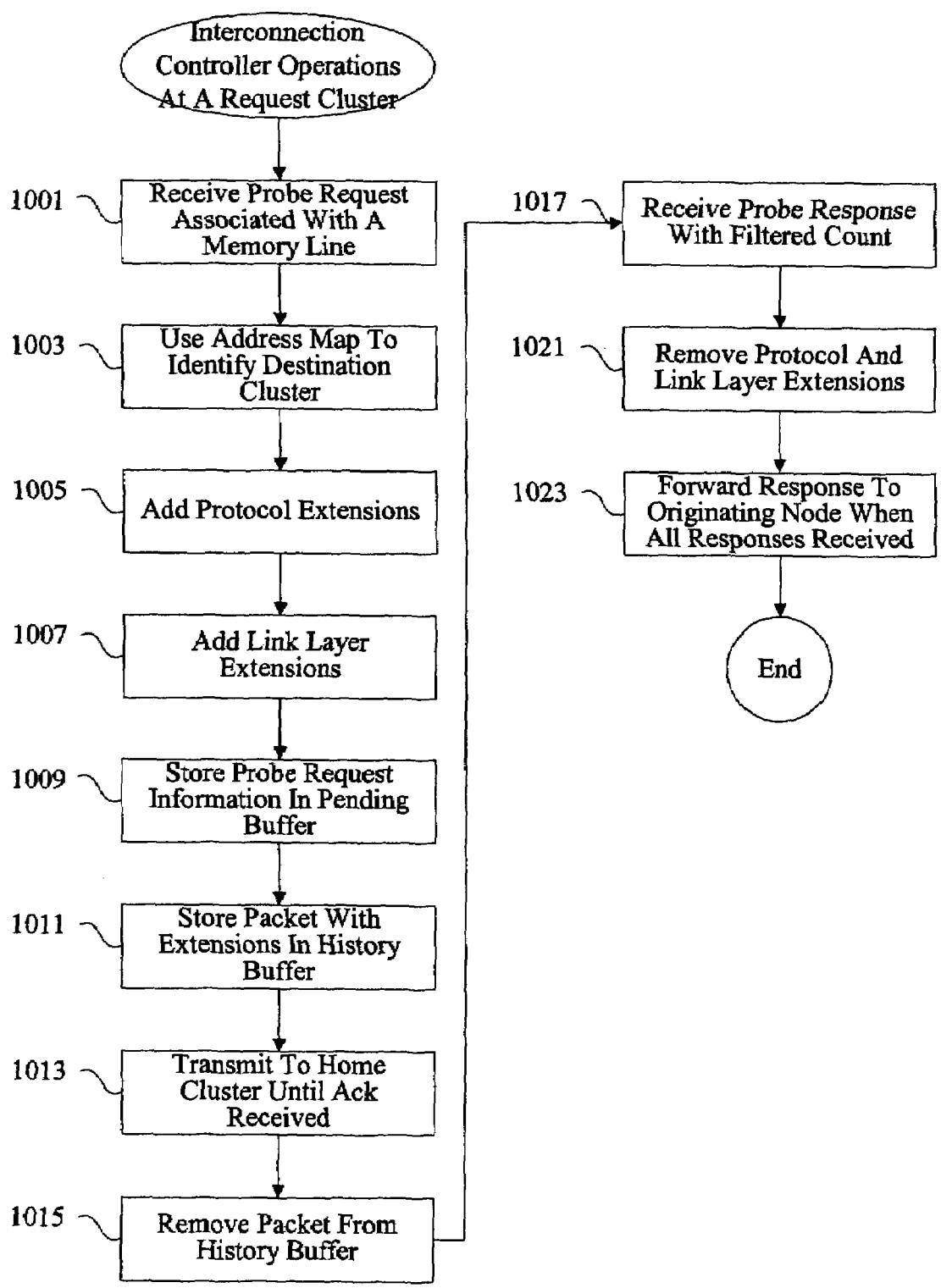
FIG. 10 is a flow process diagram showing extended packet processing at a request cluster.

FIG. 10 is a flow process diagram showing interconnection controller operations upon receiving a request from a local node. At 1001, a request such as a read request associated with a particular memory line is received from a local node. At 1003, the owning cluster of the address space including the memory line is identified. At 1005, protocol extension information is added. In one example, the source cluster identifier is set as the request cluster. The destination cluster and the target cluster identifiers are set as the clusters owning the address space including the memory line of the request. At 1007, link layer extensions are provided. At 1009, information about the request is stored in the pending buffer. At 1011, the packet to be sent is stored in the history buffer. In one example, the packet is stored with protocol extensions and link layer extensions to allow all prompt retransmission of a packet. However, it should be noted that protocol extensions and link layer extensions do not necessarily have to be saved, as they can be determined as needed. At 1013, the packet with extensions is transmitted to the home cluster.

In one example, the packet is retransmitted a predetermined number of times until an acknowledgment is received from the home cluster. At 1015, the packet is removed from the history buffer when the acknowledgment is received. At this point, probing of the memory line in various clusters may occur as shown in FIG. 9. At 1017, a response with a filtered count is received. According to various embodiments, a filtered count is provided to identify the number of probe responses to expect from other clusters in the system. It should be noted, that in some embodiments a filtered count is not provided and the request cluster simply waits for responses from all other clusters in the system. At 1021, protocol and link layer extensions from the various received packets are removed.

At 1023, the response is forwarded to the requesting node when all responses have been received from other clusters as determined by the filtered count. It should be noted that the processes shown in the various flow diagrams do not necessarily have to be performed in any particular order. For example, information associated with a probe request may be stored in a pending buffer before protocol extensions and link layer extensions are provided. Alternatively, information may be stored in the pending buffer after the packet with extensions is stored in the history buffer.

Figure 11:
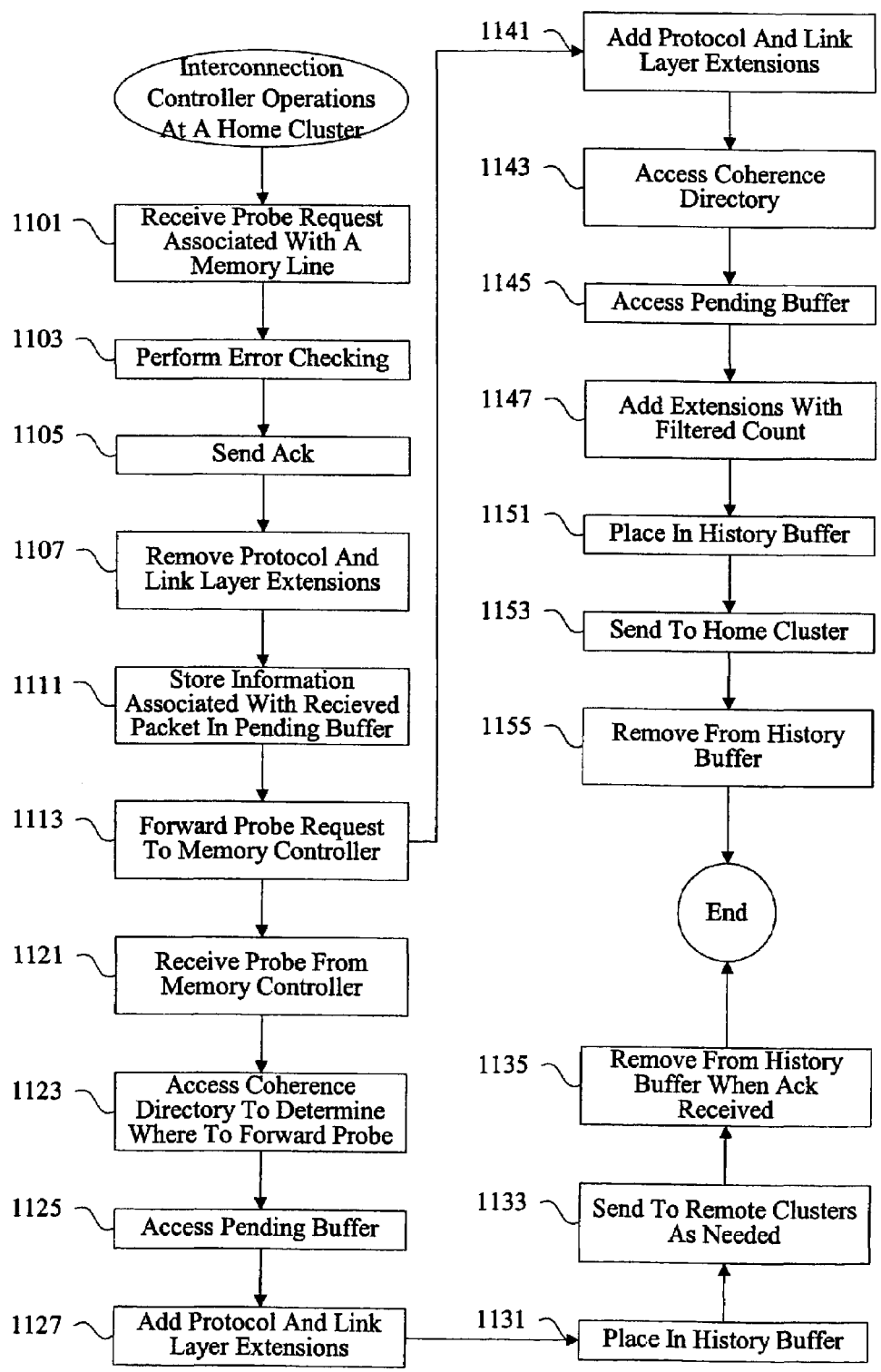
FIG. 11 is a flow process diagram showing extended packet processing at a home cluster.

FIG. 11 is a flow process diagram showing interconnection controller operations at a home cluster owning the address space including the memory line associated with a probe received from the request cluster. At 1101, a probe request is received. At 1103, error checking is performed using link layer information provided. In some examples, error correction mechanisms also used to recover corrupted bits in a packet. At 1105, acknowledgment is sent to the request cluster. At 1107, protocol and link layer extensions are removed from the packet associated with the probe request. At 1111, information about the probe request is stored in the pending buffer.

At 1113, the probe request is forwarded to a serialization point such as a memory controller. In one example, the probe request is forwarded to the memory controller associated with the CPU owning the address space of the memory line. The memory controller than probes local nodes including the interconnection controller. At 1121, the interconnection controller receives a probe from the memory controller. In 1123, the interconnection controller accesses a coherence directory to determine if the probe should be forwarded to any remote clusters. In one example, it is determined that the probe should be forwarded to a single remote cluster. At 1125, the pending buffer is accessed. At 1127, protocol extensions and link layer extensions are added using information in the pending buffer. At 1131, a copy of the information to be sent to the remote cluster is stored in the history buffer. At 1133, the packet with extensions is sent to the remote cluster.

The packet is removed from the history buffer when an acknowledgment is received. After the probe is forwarded to the memory controller, the interconnection controller may also received a probe response to 1141. At 1143, the interconnection controller accesses a coherence directory to determine the number of remote clusters to be probe. At 1145, the pending buffer is also accessed. At 1147, protocol and link layer extensions are added. In an example where a single remote cluster is probed, a value of one is provided as the filtered count. At 1151, the packet is placed in the history buffer and sent to the home cluster 1153. At 1155, the packet is removed from the history buffer when an acknowledgment is received.

Figure 12:
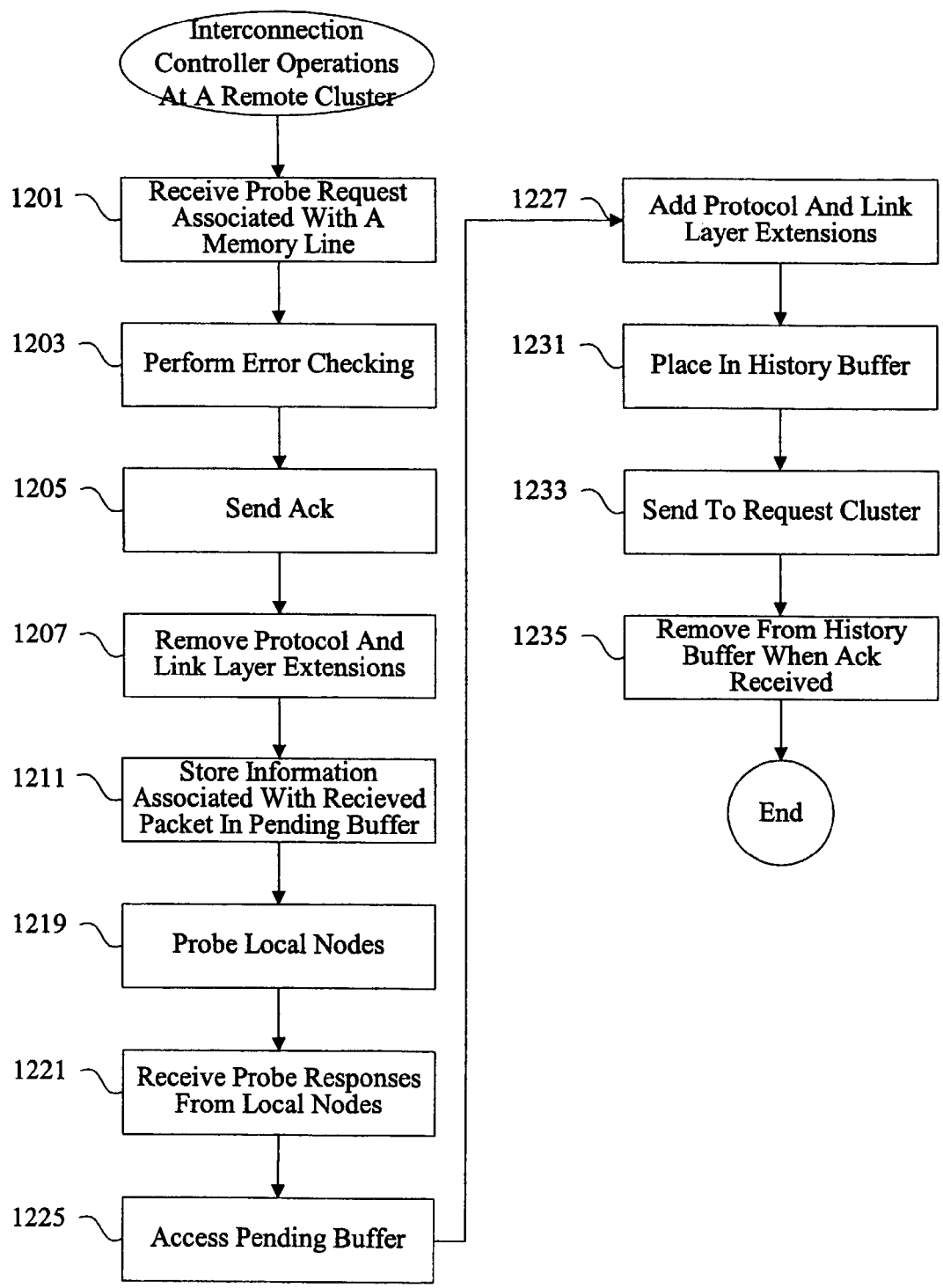
FIG. 12 is a flow process diagram showing extended packet processing at a home cluster.

FIG. 12 is a flow process diagram showing interconnection controller operations at a remote cluster probe. In one example, a remote cluster is probed because the remote cluster has a shared copy of the memory line associated with a read request. At 1201, the probe request is received. At 1203, error checking is performed and an acknowledgment is sent to the home cluster at 1205 if errors are not found. At 1207, extensions such as protocol and link layer extensions are removed from packet. At 1211, information associated with the packet is stored in the pending buffer. At 1219, the interconnection controller sends probes to local nodes to determine the state of any cached copies of the memory line. At 1221, the interconnection controller receives probe responses. At 1225, the interconnection controller accesses a pending buffer and uses information maintained in the pending buffer to generate protocol and link their extensions at 1227. At 1231, packet including the probe responses is placed in a history buffer. At 1233, the packet with extensions is sent to the request cluster. It should be noted that the packet may also be sent to a home cluster which can aggregate responses before sending an aggregate response to the request cluster. At 1235, the packet is removed from the history buffer when an acknowledgment is received.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with multiple processor clusters connected through a point-to-point, switch, or bus architecture. In another example, multiple clusters of processors may share a single interconnection controller, or multiple interconnection controllers can be used in a single cluster. Therefore, the scope of the invention should be determined with reference to the appended claims.

What is claimed is:

1. A computer system, comprising:
 a request cluster including a first plurality of processors and a request cluster interconnection controller, the first plurality of processors and the request cluster interconnection controller in communication using a point-to-point architecture;
 a home cluster including a second plurality of processors and a home cluster interconnection controller, the second plurality of processors and the home cluster interconnection controller in communication using a point-to-point architecture, wherein the home cluster interconnection controller is configured to receive a probe request associated with a memory line from the request cluster interconnection controller, wherein the probe request includes protocol extension information and link layer extension information.

2. The computer system of claim 1, wherein protocol extension information comprises a source cluster identifier and a destination cluster identifier.

3. The computer system of claim 1, wherein protocol extension information further comprises a target cluster identifier and a filtered count, wherein the target cluster identifier corresponds to a cluster owning the address space including the memory line associated with the probe request.

4. The computer system of claim 1, wherein link layer extension information comprises a sequence ID associated with the link between the request cluster interconnection controller and the home cluster interconnection controller.

5. The computer system of claim 1, wherein link layer extension information further comprises bits for error checking.

6. The computer system of claim 5, wherein link layer extension information further comprises bits for error correction.

7. The computer system of claim 1, wherein protocol extension information allows the implementation of cache coherence protocol optimizations above and beyond that which is provided by a controller associated with a processor.

8. The computer system of claim 1, wherein link layer extension information comprises a link command.

9. The computer system of claim 8, wherein the link command identifies whether the packet is a link layer packet, control packet, or data packet.

10. A method for transmitting information between multiple processor clusters, the method comprising:
 receiving a probe request associated with a memory line from a request cluster interconnection controller; and
 extracting protocol extension information and link layer extension information from the probe request at an interconnection controller in a home cluster interconnection controller in a home cluster, the home cluster including a plurality of processors connected using a point-to-point architecture.

11. The method of claim 10, wherein protocol extension information comprises a source cluster identifier and a destination cluster identifier.

12. The method of claim 10, wherein protocol extension information further comprises a target cluster identifier and a filtered count, wherein the target cluster identifier corresponds to a cluster owning the address space including the memory line associated with the probe request.

13. The method of claim 10, wherein link layer extension information comprises a sequence ID associated with the link between the request cluster interconnection controller and the home cluster interconnection controller.

14. The method of claim 10, wherein link layer extension information further comprises bits for error checking.

15. The method of claim 14, wherein link layer extension information further comprises bits for error correction.

16. The method of claim 10, wherein link layer extension information comprises a link command.

17. The method of claim 16, wherein the link command identifies whether the packet is a link layer packet, control packet, or data packet.

18. An apparatus for transmitting information between multiple processor clusters, the apparatus comprising:
 means for receiving a probe request associated with a memory line from a request cluster interconnection controller; and
 means for extracting protocol extension information and link layer extension information from the probe request at a home cluster interconnection controller in a home cluster, the home cluster including a processors connected using a point-to-point architecture.

19. The apparatus of claim 18, wherein protocol extension information comprises a source cluster identifier and a destination cluster identifier.

20. The apparatus of claim 18, wherein protocol extension information further comprises a target cluster identifier and a filtered count, wherein the target cluster identifier corresponds to a cluster owning the address space including the memory line associated with the probe request.

21. The apparatus of claim 18, wherein link layer extension information comprises a sequence ID associated with the link between the request cluster interconnection controller and the home cluster interconnection controller.

22. The apparatus of claim 18, wherein link layer extension information further comprises bits for error checking.

23. The apparatus of claim 22, wherein link layer extension information further comprises bits for error correction.

24. The apparatus of claim 18, wherein link layer extension information comprises a link command.

* * * * *